United States Patent [19]

Block

[11] 4,360,955

[45] Nov. 30, 1982

[54] METHOD OF MAKING A CAPACITIVE FORCE TRANSDUCER

[76] Inventor: Barry Block, 30610 Page Mill Rd., Los Altos Hills, Calif. 94022

[21] Appl. No.: 142,236

[22] Filed: Apr. 21, 1980

Related U.S. Application Data

[62] Division of Ser. No. 903,827, May 8, 1978, Pat. No. 4,225,755.

[51] Int. Cl.$^3$ .................................... H01G 4/00

[52] U.S. Cl. .................................... 29/25.42; 29/418

[58] Field of Search .................... 29/25.41, 25.42, 418; 369/150, 151; 179/111 R, 111 E

[56] References Cited

U.S. PATENT DOCUMENTS

| | | | |
|---|---|---|---|
| 1,813,855 | 7/1931 | Klar | 179/111 R |
| 1,975,801 | 10/1934 | Rieber | 179/111 R |
| 4,008,514 | 2/1977 | Elderbaum | 29/25.42 |

*Primary Examiner*—Carl E. Hall
*Attorney, Agent, or Firm*—Harry E. Aine

[57] ABSTRACT

A capacitive force transducer, particularly suited for use as a microphone or as a phonograph needle pick-up cartridge, comprises a diaphragm electrode insulatively held to a lip portion of a recess in a second electrode, thereby forming a capacitive detector. The lip structure of the second electrode structure has a capacitive face region diverging from a virtual pivot region at the lip where the diaphragm is pivotably affixed to the recessed electrode. In this manner, the quiescent capacitance is defined predominantly by the capacitance near the lip, which is relatively small and defined and the change in capacitance for a given deflection of the diaphragm is relatively large, thereby improving the sensitivity of the transducer. In the case of a phonographic pick-up cartridge, the pick-up needle is coupled to the diaphragm so that vibrations induced in the needle produce corresponding vibrations of the diaphragm. A batch method of fabricating the transducers comprises recessing a semiconductive wafer through a major face to define a plurality of capacitive regions around the margins of the recesses. The diaphragm is conveniently formed by a layer deposited over an insulative layer deposited on the non recessed face of the wafer. The wafer is diced to provide a batch of the transducers.

5 Claims, 13 Drawing Figures

METHOD OF MAKING A CAPACITIVE FORCE TRANSDUCER

This is a division, of application Ser. No. 903,827, filed May 8, 1978 now U.S. Pat. No. 4,225,755.

BACKGROUND OF THE INVENTION

The present invention relates in general to capacitive force transducers and more particularly to an improved capacitive force transducer particularly suited for use as a microphone or phonographic pick-up cartridge.

DESCRIPTION OF THE PRIOR ART

Heretofore, capacitive microphones have been made in such a manner that one electrode of the capacitor was formed by an electrically conductive diaphragm insulatively affixed over and closely spaced via an air gap from a plate-shaped electrode forming the second electrode of the microphone. The diaphragm was closely spaced, on the order of 0.5 mils to 1.0 mils from the plate electrode and a relatively high DC voltage bias voltage of approximately 300 volts was applied between the two electrodes. Variations in the spacing between the electrodes, due to deflection of the diaphragm in response to the force of acoustic wave energy incident thereon, produced a change in capacitance which was then detected.

This type of microphone is disclosed in a book titled "Selected Reprints From Technical Review-Measuring Microphones", published by Brüel and Kjaer of Copenhagen, Denmark in 1972 see particularly pages 3–11.

While such measuring microphones are particularly sensitive and accurate they have a number of problems associated therewith. One of the problems is that the source of D.C. polarizing voltage must be very precisely and accurately controlled. While control of low voltages on the order of 15 volts D.C. are relatively easily achieved by integrated circuit techniques, control of much higher voltages on the order of 200–300 volts is much more difficult of realization, and therefore adds greatly to the cost of the microphone. In addition, since the sensitivity of the microphone is closely related to the spacing between the diaphragm and the plate-shaped electrode, this spacing on the order of 0.8 mils, must be accurately controlled, which introduces close machining tolerances which are difficult to hold in production and difficult to maintain over a widely varying temperature environment due to differential thermal expansions of elements making up the microphone structure.

Prior attempts to eliminate the problem of providing the relatively highly stable D.C. bias have involved the use of foil-electret materials as the deformable diaphragm member of the capacitive structure. Foil-electret type microphones are disclosed in an article titled, "Foil-Electret Microphones", appearing in the *Journal of Acoustical Society of America,* Vol. 40 No. 6, published in 1966 at pages 1433–1440.

While the electret microphone eliminates a D.C. bias and provides a higher sensitivity, it is prone to changing its performance characteristics under hostile environments of temperature and humidity. In addition the performance characteristics of the microphone, due to the instabilities of the foil-electret material, tend to degrade with time.

Accordingly, it is desired to provide an improved capacitive type transducer useful as a microphone, phonographic pick-up cartridge, etc. which has the advantages of the air gap type of condenser microphone while eliminating the requirements for a relatively high D.C. polarizing voltage. It would also be desirable if such an improved transducer could be fabricated by batch semiconductive processing techniques.

SUMMARY OF THE PRESENT INVENTION

The principal object of the present invention is the provision of an improved capacitive force transducer useful, for example, as a microphone, phonographic pick-up cartridge, etc.

In one feature of the present invention, the diaphragm electrode of the capacitive transducer is pivotably affixed to the lip region of a recessed second electrode of the capacitive structure, such that the capacitance of the force transducer is predominantly determined by the capacitive region of the lip in the immediate vicinity of the pivotable point of attachment of the diaphragm, whereby the sensitivity of the capacitive force transducer is increased, thereby obviating the requirement for a relatively high and stable D.C. polarizing voltage.

In another feature of the present invention, a phonographic pick-up needle is mechanically coupled to the diaphragm electrode of the capacitive transducer, whereby an improved phonographic capacitive pick-up cartridge is provided.

In another feature of the present invention, a batch of capacitive transducers of the present invention are fabricated by recessing through the major face of a wafer at selected locations to define a batch of capacitive regions at the marginal edges of the recessed portions of the wafer, and a diaphragm electrode structure is formed over the recessed portions of the wafer to define a batch of capacitive force transducers.

Other features and advantages of the present invention will become apparent upon a perusal of the following specification taken in connection with the accompanying drawings wherein;

DESCRIPTION OF THE PREFERRED EMBODIMENTS

Figure 1:
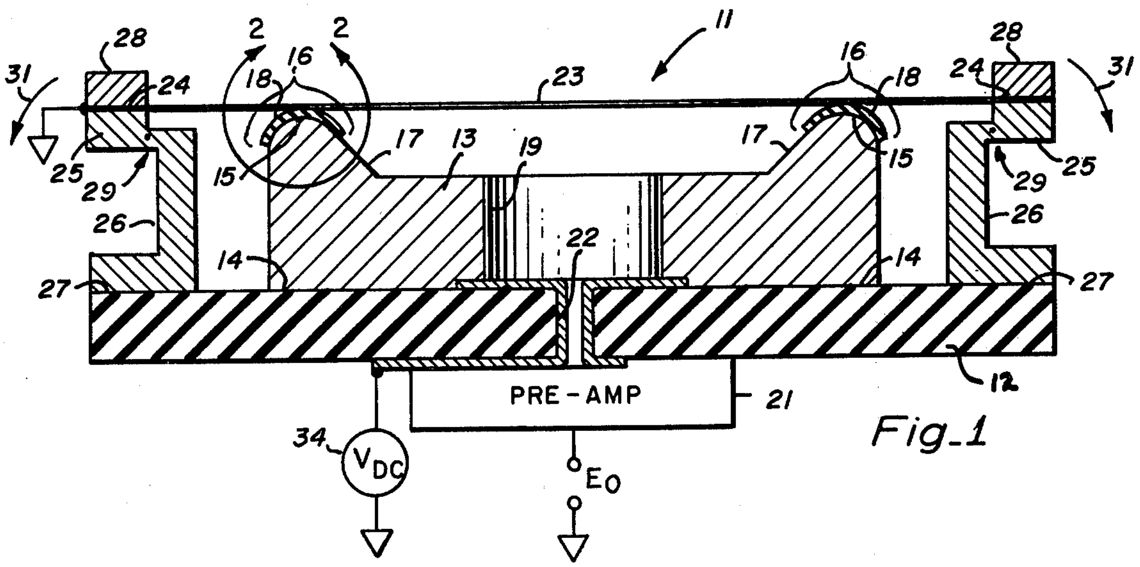
FIG. 1 is a longitudinal sectional view of a capacitive transducer structure incorporating features of the present invention.
Figure 2:
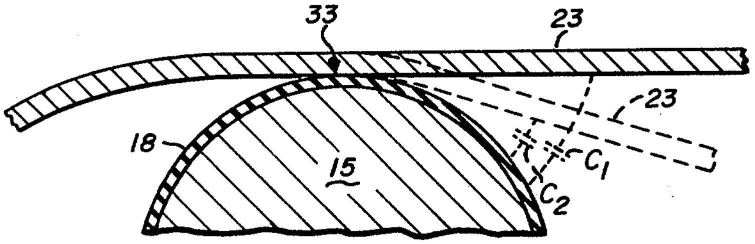
FIG. 2 is an enlarged detail view of a portion of the structure of FIG. 1 delineated by line 2—2.

Referring now to FIGS. 1 and 2, there is shown a capacitive force transducer 11 incorporating features of the present invention. The transducer 11 includes an electrically insulative base plate 12, as of alumina. An annular electrically conductive centrally recessed electrode 13, as of copper, is fixedly secured centrally of the insulative plate 12, at 14, as by conventional metalizing and solder techniques.

The electrode 13 includes an annular lip portion 15 extending about the periphery of the central recess. The lip 15 includes an upper curved or rounded portion 16 and an inwardly directed beveled portion 17. A thin film of electrically insulative material 18, as of silicon nitride, as of two microns thick, is deposited over the curved or upper surface 16 of the lip 15. The electrode 13 includes a central aperture or bore 19 and is electrically connected to the input of a preamplifier 21 via an electrically plated hole 22 interconnecting electrode 13 and the input of the preamplifier 21.

A thin deflectable diaphragm 23, as of 0.0005 inch thick nickel foil, is tensioned across the upper surface of the electrode 13 in electrically insulative relation thereto, thereby forming a deflectable electrode of the capacitive transducer 11. The outer periphery of the diaphragm 23 is soldered at 24 to the upper lip 25 of a cylindrical support 26, as of copper. The cylindrical support 26 is fixedly secured to the insulative base plate 12 via metalizing and soldering at 27. A clamping ring 28, as of copper, is soldered over the upper face of the diaphragm 23 in such a manner that the diaphragm 23 is sandwiched between the clamping ring 28 and the upper lip 25, such diaphragm 23 being soldered to both the ring 28 and to the upper lip 25 of the support 26, at 24.

The cylindrical support 26 is of U-shape cross section and includes a relatively thin neck portion, at 29. After the diaphragm 23 has been soldered in place across the upper surface of the capacitive electrode 13, the diaphragm 28 is tensioned in supportive contact over the curved lip portion 16 of the electrode 13 by pressing the clamping ring 28 downwardly in the direction of the arrows 31, thereby causing the upper lip portion 25, with the affixed diaphragm 23, to pivot outwardly and downwardly about the pivot points 29 so as to tension the membrane 23 into firm supportive contact with the lip portion 15 of electrode 13.

Forces to be transduced to an electrical output, such as acoustic wave energy, are applied to the diaphragm 23 to produce deflection of the diaphragm in the manner as indicated in FIG. 2. Due to the very thin dimension of the insulative layer 18, the capacitance between the deflectable electrode 23 and the supportive electrode 13 is predominantly attributable to the annular region associated with the lip 15. As the diaphragm 23 is deflected toward and away from the inside surface of the lip 15, the capacitance between the lip 15 and the diaphragm electrode 23 changes substantially.

Let $C_0$ be the quiescent capacitance between the diaphragm 23 and the lip 15 in the absence of deflection, and let capacitance $C_1$ be the capacitance between the diaphragm 23 and the lip 15 when the diaphragm is inwardly distended or deflected about a virtual pivot point 33 which extends along the direction of elongation of the lip 15. $C_0$-$C_1$, is $\Delta C$ and $\Delta C/C_0$ is the sensitivity of the force transducer.

The advantage to the capacitive force transducer 11, as contrasted with the aforecited prior art air gap type transducer, is that the quiescent capacitance of the transducer $C_0$ is substantially smaller in the case of the present transducer due to the reduction in the closely spaced mutually opposed area of the two capacitive electrodes 13 and 23. More particularly, due to the fact that the capacitance is predominantly attributable to the capacitance between the diaphragm 23 and the lip 15, in the closely spaced region near the virtual pivot 33, $C_0$ is substantially reduced. This increases the ratio of $\Delta C$ over $C_0$, where $\Delta C$ is the change in capacitance due to a given deflection of the diaphragm around the pivot point 33. Thus, the sensitivity of the capacitive transducer 11 is substantially improved over the prior art air gap microphone.

Because the quiescent value of capacitance of the transducer $C_0$ is substantially reduced, as contrasted with the conventional air gap capacitive transducer, the D.C. polarizing voltage applied to the capacitor can be substantially reduced from a voltage on the order of 300 volts to a voltage on the order of 15 volts. At such a reduced voltage, the power supply for polarizing the capacitor detector 11, i.e., $V_{DC}$ as supplied by supply 34 can be reduced to on the order of 15 volts. Such a relatively low voltage is easily controlled and stabilized by conventional integrated circuit techniques. As a consequence, the cost of the power supply 34 is substantially reduced, as contrasted with the prior art.

Furthermore, another advantage of the capacitive transducer 11 of the present invention, as contrasted with the prior air gap capacity detector, is that the mechanical tolerances required are greatly reduced, as the thickness of the dielectric layer 18 controls the spacing between the deflectable electrode 23 and the stationary electrode 13 in the critical region. Utilizing conventional techniques, developed in the integrated circuit art, the thickness of the layer 18 is readily controlled to on the order of a few hundred angstroms or less.

In an alternative embodiment, the insulative layer 18 is deposited on the underside of the diaphragm 23.

In a second alternative embodiment the diagram 23 is bonded to the lip portion 15 via a gold layer deposited on the peak of the ridge 15 and the underside of the diaphragm is coated with a gold-germanium eutectic. The diagram 23 is held in position and heated to the eutectic temperature for bonding the diaphragm 23 to the peak of the ridged lip 15 essentially only at the virtual pivot point.

Figure 3:
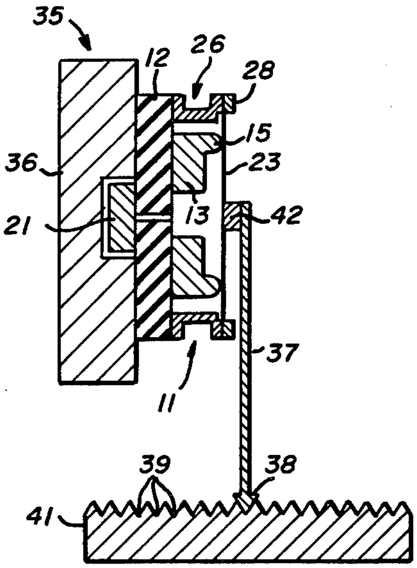
FIG. 3 is a transverse sectional view through a phonographic pick-up cartridge incorporating features of the present invention.
Figure 4:
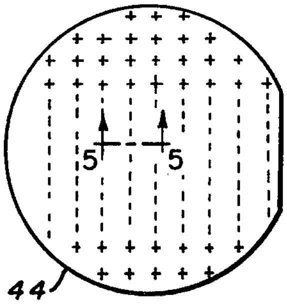
FIG. 4 is a plan view of a semiconductive wafer depicting the selected locations, by "+"s, of capacitive transducers of the present invention to be formed therein.
Figure 5:
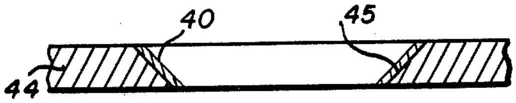
FIG. 5 is a transverse sectional view of a portion of the wafer of FIG. 4 taken along line 5—5 in the direction of the arrows and depicting the region wherein one of the capacitive transducers of the present invention is to be formed therein.

Referring now to FIG. 3 there is shown a phonographic pick-up cartridge 35 incorporating features of the present invention. Cartridge 35 includes the capacitive transducer 11 affixed to an arm 36 of a phonographic pick-up. The phonograph pick-up needle 37, which includes a diamond stylus 38, rides in the groove 39 of the recording disc 41 and picks up mechanical vibrations induced in the needle 37 which are transmitted to the diaphragm 23 via a mechanical linking or coupling member 42 fixedly secured to the central region of the diaphragm 23.

In a typical example, diaphragm 23 includes a solder pad 42 soldered or deposited as by electroplating to the central region of the diaphragm 23. The phonograph pick-up needle 37 is in turn soldered to the pad 42. In this example, the diaphragm 23 may be substantially thicker than that contemplated for use in a microphone pick-up, such as that described above with regard to FIGS. 1 and 2. The vibrations induced in the pick-up needle 37 are transmitted via the connecting pad 42 into the diaphragm 23. The electrical output $E_0$ is taken from the output of the preamlifier 21 and processed in the conventional manner.

In an alternative embodiment, the needle 37 is mounted perpendicular to the plane of the diaphragm 23.

Referring now to FIGS. 4–8 there is shown a batch method, for fabricating capacitive transducers 11, employing semiconductor integrated circuit technology. Referring now to FIG. 1 there is shown a typical wafer 44 from which a batch of capacitive force transducers 11 are to be fabricated according to the process of the present invention. In a typical example, the wafer 44 is made of a nonmetallic monocrystalline material, such as silicon, germanium, quartz, gallium phosphide, etc.

In a preferred embodiment, the wafer 44 is made of a diamond cubic material, such as silicon and the wafer 44 has a thickness as of 10 mils or 254±2 microns, and with a convenient diameter, such as 3 to 5 inches. In the case of diamond cubic material, the 100 crystallographic plane is preferably formed at the upper and lower major faces of the wafer 44. Furthermore, the wafer 44 in the case of silicon, is preferably doped with an N type dopant, such as phosphorous to a resistivity of 6 to 8 ohm-centimeters.

In the next step of the fabrication process, the upper major face of the wafer 44 is masked off by photoresist, developed in the desired pattern of recesses, and then anisotropically etched along certain crystallographic boundaries to recess apertures 45 through the semiconductive layer 44, thereby providing an array of recessed apertures 45 through the base layer 44. A typical example of an anisotropic etchant is 25 percent of weight of sodium hydroxide in water. In the next step, the inside walls of the recess 45 are rendered electrically conductive by sputtering a metallic material 40 onto the inside walls of the recesses.

Figure 6:
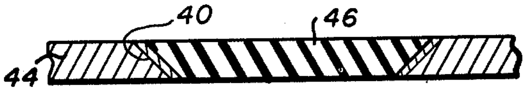
FIG. 6 is a view similar to that of FIG. 5 depicting a subsequent step in the process of fabricating the transducers in accordance with a method of the present invention.

Next, the recesses 45 are filled with polycrystalline silicon 46 or other suitable material. The wafer with filled recesses is then reground on the upper face, as shown in FIG. 6.

Figure 7:
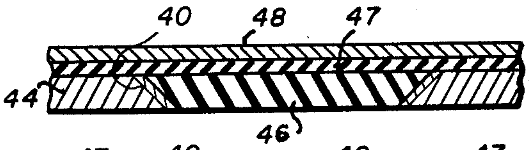
FIGS. 7 and 8 are views similar to that of FIG. 6 depicting subsequent steps in the fabrication process.

In a subsequent step of the fabrication process as shown in FIG. 7, a relatively thin layer 47 of electrically insulative material, such as silicon nitride, is deposited over the top surface of the wafer 44 to a thickness, as of 2 microns. A convenient method of applying the silicon nitride layer is by chemical vapor deposition.

Thereafter, a metallic layer 48 is formed to the desired thickness as of 0.0005 inch, by sputter depositing or evaporating a metal such as Ni, onto the silicon nitride and then electrodepositing the remainder of the layer 48.

Figure 8:
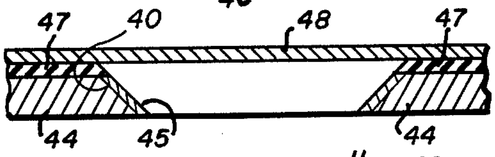

Thereafter the polycrystalline plug 46 and insulative layer 47 are removed from the backside of the metallic layer 48 by means of a suitable etchant which etches the polycrystalline silicon and silicon nitride without attacking or etching the monocrystalline silicon and metal layer 48 and coating on the walls 45. The resultant structure appears as shown in FIG. 8, wherein the electrically conductive diaphragm 48 is electrically insulatively supported from the marginal edge of the recess 45 via the remaining thin insulative layer 47.

Figure 9:
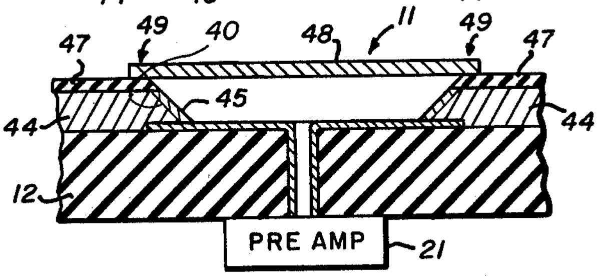
FIG. 9 is a view similar to that of FIG. 8 depicting the capacitive transducer structure of FIG. 8 mounted to a base plate and including a preamplifier mounted thereon.

The upper surface of the diaphragm 48 is then coated with photoresist in the desired pattern and etched through to the silicon nitride insulative layer 47 to define a multiplicity of capacitive transducer structures 11, as shown in FIG. 9. The wafer 44 is then diced and the dies are attached to the base members 12, as of alumina ceramic, via a conventional die-attach technique. Then leads are attached in the conventional manner to form individual capacitive force transducer devices 11.

The advantage to the batch fabrication method depicted in FIGS. 4–8 is that conventional integrated circuit techniques may be employed for batch fabrication of capacitive force transducers, thereby greatly reducing their cost. In addition, the capacitance of each device 11 is precisely defined by the angle the inside wall of the recess 47 makes with the diaphragm 46 in the region of the virtual pivot 49. Because this crystallographic plane has a very precise angular orientation relative to the top and bottom surface of the wafer 44, the capacitance between the diaphragm 46, and the lip of the recess 47 is precisely determined and readily duplicated in all devices.

Referring now to FIGS. 10A–10D, there is shown an alternative batch fabrication process of the present invention. In this method, the wafer 44 is recessed at 45 in the manner as previously described with regard to FIGS. 4 and 5 to define a wafer having a multitude of recesses 45 therein each recess corresponding to the location of a capacitive force transducer 11 to be formed in the wafer 44.

Next, the wafer 44 is masked by means of a suitable photoresist material in accordance with the desired pattern of lip portions 15 to be formed, there being one annular lip portion 15 for each of the transducers to be formed. Next, a conductive layer 40 is deposited on the upper surface of the wafer in accordance with the photoresist pattern to provide an electrically conductive path from the ridge 15 to be formed down across the surface of the aperture 45. Next, ridge 15 is formed by electrodepositing an electrically conductive material such as copper onto the annular coated pattern formed on the major face of the wafer at each force transducer location. The ridge is electrodeposited to a suitable height as of a few mils.

Next, an electrically insulative material, such as silicon nitride, is deposited to a desired thickness as of 2 microns over the ridges 15 to provide the electrically insulative layer 18.

Figure 10A:
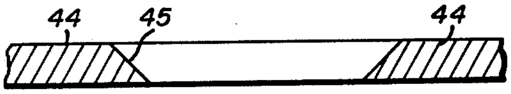
FIGS. 10A–10D are views similar to FIGS. 5–9 depicting a sequence of fabrication steps in a batch fabrication process of the present invention.
Figure 10B:
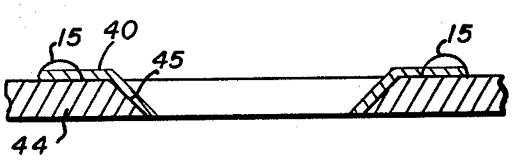
Figure 10C:
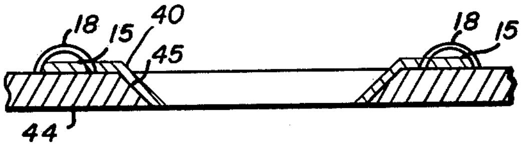
Figure 10D:
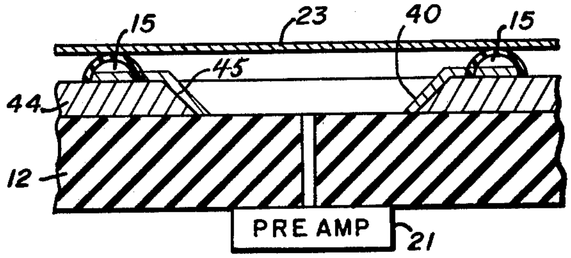

Next, the peak portion of the ridge 18 is coated with a gold coating and the diaphragm 23, as of 0.0005 inch thick nickel, having its underside coated with a gold-germanium eutectic, as previously described above, is stretched taut over the ridges 15, as shown in FIG. 10D. Then the wafer having the diaphragm held thereto is heated to a suitable temperature to cause the eutectic to bond with the gold coating on the peak portion of the ridges 15 to bond the diaphragm to the insulative layer 18 on the ridges 15, essentially only at the virtual pivot point.

Next, the diaphragm is coated with a layer of photoresist and then etched through to define the individual diaphragm portions, there being one for each of the transducers in the manner as indicated in FIG. 9. The wafer 44 with the diaphragm electrodes mounted thereto is then diced and each die bonded to the alumina ceramic substrate 12 which has the preamplifier connected through the electrically conductive plated hole 22 which in-turn makes connection to the ridge 15 via the plating along the inside wall of the recess 45 to define an individual force transducer 11.

What is claimed is:

1. In a method for fabricating a batch of capacitive transducers, the step of;

forming a plurality of electrically conductive lip portions at selected locations at a first major face of a wafer to define a plurality of capacitive regions along the margins of said conductive lip portions of the wafer;

adhering in electrically insulative relation an electrically conductive deflectable electrode structure to said wafer overlaying the selected locations of said plurality of capacitive regions to define a plurality of capacitive transducer portions therebetween, said deflectable electrode structure being pivotably deflectable relative to said capacitive regions about regions of adherence of said deflectable electrode and said wafer, dimensioning said conductive lip portions relative to the spacing from the deflectable electrode to said wafer such that the capacitance of each of said capacitive transducer portions is predominantly attributable to the mutually opposed capacitive regions in the immediate vicinity of said regions of adherence of said deflectable electrode to said wafer; and separating said wafer with said adhered deflectable electrode structure into a plurality of capacitive transducers.

2. The method of claim 1 wherein the step of electrically insulatively adhering the deflectable electrode structure overlaying the selected locations of said capacitive regions comprises the step of, depositing and electrically conductive layer over at least said selected locations of a major face of said wafer.

3. The method of claim 1 wherein the step of electrically insulatively adhering the deflectable electrode structure overlaying the selected locations of said capacitive regions comprises the steps of, depositing an electrically insulative layer over at least the selected locations on a major face of said wafer, and depositing an electrically conductive layer adherently onto said electrically insulative layer.

4. The method of claim 1 wherein the step of forming the lip portions at said plurality of selected locations of said wafer includes the step of, depositing ridge portions at said major face of the wafer, whereby the side margins of said ridge portions define said plurality of capacitive regions.

5. In a method for fabricating a batch of capacitive transducers, the steps of;

forming a plurality of electrically conductive lip portions at selected locations at a first major face of a wafer by anisotropically etching the wafer through a major face of the wafer to define a plurality of capacitive regions along the margins of said conductive lip portions of the wafer;

electrically insulatively affixing an electrically conductive deflectable electrode structure over the selected locations of said plurality of capacitive regions to define a plurality of capacitive transducer portions therebetween;

and separating said wafer with said attached deflectable electrode structure into a plurality of capacitive transducers.

* * * * *